(12) United States Patent
Hoang (10) Patent No.: US 8,583,680 B2
(45) Date of Patent: Nov. 12, 2013

(54) SYSTEM AND METHOD FOR INTEGRATING, MANAGING AND COORDINATING CUSTOMER ACTIVITIES

(75) Inventor: Khanh Hoang, Orange, CA (US)

(73) Assignee: Informatica Corporation, Redwood City, CA (US)

( * ) Notice: Subject to any disclaimer, the term of this patent is extended or adjusted under 35 U.S.C. 154(b) by 0 days.

(21) Appl. No.: 13/471,422

(22) Filed: May 14, 2012

(65) Prior Publication Data

US 2012/0290610 A1  Nov. 15, 2012

Related U.S. Application Data

(63) Continuation of application No. 10/449,171, filed on May 29, 2003, now Pat. No. 8,200,622.

(60) Provisional application No. 60/384,434, filed on May 31, 2002.

(51) Int. Cl.
*G06F 17/30* (2006.01)

(52) U.S. Cl.
USPC .......................................... 707/769

(58) Field of Classification Search
None
See application file for complete search history.

(56) References Cited

U.S. PATENT DOCUMENTS

| | | |
|---|---|---|
| 5,600,832 A | 2/1997 | Eisenberg et al. |
| 5,710,887 A | 1/1998 | Chelliah et al. |
| 5,734,887 A | 3/1998 | Kingberg et al. |
| 5,884,325 A | 3/1999 | Bauer et al. |
| 5,956,499 A | 9/1999 | Colgan |
| 5,970,490 A | 10/1999 | Morgenstern |
| 6,014,647 A | 1/2000 | Nizzari et al. |
| 6,044,382 A | 3/2000 | Martino |
| 6,151,608 A | 11/2000 | Abrams |
| 6,324,541 B1 | 11/2001 | de L'etraz et al. |
| 6,332,163 B1 | 12/2001 | Bowman-Amuah et al. |
| 6,345,288 B1 | 2/2002 | Reed et al. |
| 6,477,580 B1 | 11/2002 | Bowman-Amuah et al. |

(Continued)

FOREIGN PATENT DOCUMENTS

| | | |
|---|---|---|
| AU | 2003231931 | 12/2003 |
| AU | 2009222633 | 10/2009 |

(Continued)

OTHER PUBLICATIONS

Portions of Prosecution History of U.S. Appl. No. 10/447,171, filed May 11, 2012, Hoang, Khanh.

(Continued)

*Primary Examiner* — Syed Hasan
(74) *Attorney, Agent, or Firm* — Adeli & Tollen, LLP (57) ABSTRACT

A system, method and computer program product for integrating, managing and coordinating activities of customers in an enterprise, across a plurality of applications, resources and touch-points. Customer data is obtained during interactions between a customer and an application, a resource or a touch-point. This data is stored in the form of virtual composite objects in cache memory, on a cluster of servers. The virtual composite objects contain customer data, policies and behaviors of the enterprise. The applications query for the virtual composite objects through the server. The server hosting the queried virtual composite object delivers the queried virtual composite object in real time to the querying application. Any updates to the virtual composite object on account of events at the applications, resources or touch-points, is carried out in real time.

13 Claims, 7 Drawing Sheets

(56) References Cited

U.S. PATENT DOCUMENTS

| | | | |
|---|---|---|---|
| 6,519,571 | B1 | 2/2003 | Guheen et al. |
| 6,523,041 | B1 | 2/2003 | Morgan et al. |
| 6,529,909 | B1 | 3/2003 | Bowman-Amuah |
| 6,529,948 | B1 | 3/2003 | Bowman-Amuah |
| 6,542,896 | B1 | 4/2003 | Gruenwald |
| 6,604,113 | B1 | 8/2003 | Kenyon et al. |
| 6,718,386 | B1 | 4/2004 | Hanfland |
| 6,765,594 | B2 | 7/2004 | Hautt et al. |
| 6,826,568 | B2 | 11/2004 | Bernstein et al. |
| 6,839,720 | B1 | 1/2005 | Thibodeau |
| 6,947,951 | B1 | 9/2005 | Gill |
| 7,054,858 | B2 * | 5/2006 | Sutherland ............................ 1/1 |
| 7,401,057 | B2 | 7/2008 | Eder |
| 7,496,588 | B2 | 2/2009 | Wong et al. |
| 7,509,326 | B2 | 3/2009 | Karabel et al. |
| 7,523,121 | B2 | 4/2009 | Hoang et al. |
| 7,945,551 | B1 * | 5/2011 | Alpern et al. ................. 707/706 |
| 8,065,266 | B2 | 11/2011 | Hoang et al. |
| 8,150,803 | B2 | 4/2012 | Hoang et al. |
| 8,166,048 | B2 | 4/2012 | Wong et al. |
| 8,200,622 | B2 | 6/2012 | Hoang |
| 8,271,477 | B2 | 9/2012 | Sood et al. |
| 8,392,460 | B2 | 3/2013 | Hoang et al. |
| 2001/0034743 | A1 * | 10/2001 | Thomas ..................... 707/501.1 |
| 2001/0051946 | A1 | 12/2001 | Nishikawa |
| 2002/0004793 | A1 | 1/2002 | Keith, Jr. |
| 2002/0052551 | A1 | 5/2002 | Sinclair et al. |
| 2002/0062241 | A1 * | 5/2002 | Rubio et al. ..................... 705/10 |
| 2002/0087571 | A1 | 7/2002 | Stapel et al. |
| 2002/0094711 | A1 | 7/2002 | Hellbusch et al. |
| 2003/0065659 | A1 | 4/2003 | Agarwal et al. |
| 2003/0069780 | A1 | 4/2003 | Hailwood et al. |
| 2003/0084016 | A1 | 5/2003 | Norgaard et al. |
| 2003/0105887 | A1 | 6/2003 | Cox et al. |
| 2003/0167253 | A1 | 9/2003 | Meinig |
| 2003/0187716 | A1 | 10/2003 | Lee |
| 2003/0195904 | A1 | 10/2003 | Chestnut et al. |
| 2003/0197733 | A1 | 10/2003 | Beauchamp et al. |
| 2003/0212654 | A1 | 11/2003 | Harper et al. |
| 2003/0217333 | A1 | 11/2003 | Smith et al. |
| 2003/0236776 | A1 | 12/2003 | Nishimura et al. |
| 2004/0073567 | A1 | 4/2004 | Pelon |
| 2004/0083199 | A1 | 4/2004 | Govindugari et al. |
| 2004/0093330 | A1 | 5/2004 | Westphal |
| 2004/0117358 | A1 | 6/2004 | Von Kaenel et al. |
| 2004/0225629 | A1 | 11/2004 | Eder |
| 2004/0230747 | A1 | 11/2004 | Ims et al. |
| 2004/0243613 | A1 | 12/2004 | Pourheidari |
| 2005/0044009 | A1 | 2/2005 | Stone et al. |
| 2005/0066059 | A1 | 3/2005 | Zybura et al. |
| 2005/0076036 | A1 | 4/2005 | Le |
| 2005/0149539 | A1 | 7/2005 | Cameron et al. |
| 2005/0165812 | A1 | 7/2005 | White et al. |
| 2005/0182785 | A1 | 8/2005 | Oswalt |
| 2005/0228805 | A1 | 10/2005 | Britton et al. |
| 2005/0257193 | A1 | 11/2005 | Falk et al. |
| 2005/0278270 | A1 | 12/2005 | Carr et al. |
| 2006/0085437 | A1 | 4/2006 | Brodhun et al. |
| 2006/0085464 | A1 | 4/2006 | Beuch et al. |
| 2006/0167947 | A1 | 7/2006 | Dunkle |
| 2007/0214179 | A1 | 9/2007 | Hoang |
| 2008/0275731 | A1 | 11/2008 | Rao et al. |
| 2010/0121877 | A1 | 5/2010 | Fawcett et al. |

FOREIGN PATENT DOCUMENTS

| | | |
|---|---|---|
| EP | 1118948 | 7/2001 |
| EP | 1509878 | 3/2005 |
| EP | 1974249 | 10/2008 |
| EP | 1974276 | 10/2008 |
| JP | 11-015903 | 1/1999 |
| JP | 11-161713 | 6/1999 |
| JP | 11-232327 | 8/1999 |
| JP | 2000-322442 | 11/2000 |
| JP | 2001-325427 | 11/2001 |
| WO | WO 01/15030 | 3/2001 |
| WO | WO 01/52056 | 7/2001 |
| WO | WO 02/063491 | 8/2002 |
| WO | WO 03/102867 | 12/2003 |
| WO | WO 2005/064491 | 7/2005 |
| WO | WO 2007/002686 | 1/2007 |
| WO | WO 2007/079467 | 7/2007 |
| WO | WO 2007/081666 | 7/2007 |

OTHER PUBLICATIONS

Portions of prosecution history of AU2003231931, May 19, 2009 (mailing date), Siperian, Inc.

Portions of prosecution history of AU2009222633, Feb. 27, 2012 (mailing date), Siperian, Inc.

International Search Report for PCT/US2003/017125, Sep. 11, 2003 (mailing date), Siperian, Inc.

International Search Report and Written Opinion for PCT/US2006/025017, Jul. 31, 2007 (mailing date), Siperian, Inc.

International Preliminary Report on Patentability for PCT/US2006/025017, Jan. 17, 2008 (mailing date), Siperian, Inc.

International Search Report and Written Opinion for PCT/US2006/062721, Feb. 14, 2008 (mailing date), Siperian, Inc.

International Preliminary Report on Patentability for PCT/US2006/062721, Jul. 17, 2008 (mailing date), Siperian, Inc.

International Search Report and Written Opinion for PCT/US2007/060021, Feb. 15, 2008 (mailing date), Siperian, Inc.

International Preliminary Report on Patentability for PCT/US2007/060021, Jul. 17, 2008 (mailing date), Siperian, Inc.

Angles, Renzo, et al., "Querying RDF Data from a Graph Database Perspective," May 19, 2005, pp. 346-360, vol. 3532, Springer-Verlag, Berlin, Germany.

Bernstein, Philip A., et al., "Principles of Transaction Processing for the Systems Professional," Month Unknown 1997, pp. 241-266 and 311-324, Morgan Kauffman Publishers, Inc., San Francisco, CA.

Chieu, Trieu C., et al., "Unified Solution for Procurement Integration and B2B Stores," ACM, Sep. 2003, pp. 61-67, ACM, Pittsburg, PA.

Elfeky Mohamed G., et al "TAILOR: A Record Linkage Toolbox," Proceedings 18$^{TH}$. International Conference on Data Engineering, Feb. 26, 2002, pp. 17-28.

Fung, Chun Che, et al., "Intelligent Meters for Improved System Operation and Customer Relationship Management," International Conference on Power System Technology, May 2002, pp. 1758-1762, vol. 3, IEEE.

Ghemawat, Sanjay, et al., "The Google File System," Oct. 19-22, 2003, pp. 29-43 ACM, Bolton Landing, NY.

Goodman, Nathan, "Bill of Materials in Relational Database," Mar. 21, 1990, pp. 2-12, vol. 5, No. 1, Iowa City, IA.

Graves, Mark, et al., "Graph Database Systems," IEEE Engineering in Medicine and Biology Magazine, Nov. 1, 1995, pp. 737-745, vol. 14, No. 6, IEEE.

Kiesel, Norbert, et al., "GRAS, a Graph-Oriented Database System for (Software) Engineering Applications," Proceeding of the Sixth International Workshop on Singapore Jul. 19, 1993, pp. 272-286, Los Alamitos, CA.

Ponniah, Paulraj, "Data Warehousing Fundamentals: A Comprehensive Guide for It Professionals," Month Unknown 2001, 527 pages, John Wiley & Sons, Inc., New York, NY.

Rahm, Erhard, et al., "Data Cleaning: Problems and Current Approaches," Quarterly Bulletin of the Computer Society of the IEEE Technical Committee on Data Engineering, Dec. 1, 2000, pp. 1-11, Washington, D.C.

Walton, Cheryl, "Managing Multiple Databases," http://support.novell.com/techcenter/articles/nc1999_10b.html,Oct. 1, 1999, pp. 1-9 Novell.

Yan, Lian, et al., "Improving Prediction of Customer Behavior in Nonstationary Environments," International Joint Conference on Neural Networks, Jul. 2001, pp. 2258-2263, vol. 3.

* cited by examiner

SYSTEM AND METHOD FOR INTEGRATING, MANAGING AND COORDINATING CUSTOMER ACTIVITIES

CLAIM OF BENEFIT TO PRIOR APPLICATIONS

This application is a continuation application of U.S. patent application Ser. No. 10/449,171, filed May 29, 2003, now U.S. Pat. No. 8,200,622 now published as U.S. Publication 2004/0006506. U.S. patent application Ser. No. 10/449,171 claims priority from U.S. Provisional Patent Application Ser. No. 60/384,434 for "Customer Activity Coordination," filed May 31, 2002. U.S Publication 2004/0006506 and U.S. Provisional Patent Application 60/384,434 are incorporated herein by reference.

BACKGROUND OF THE INVENTION

1. Field of the Invention

The present invention relates generally to enterprise applications used in organizations. In particular, the invention relates to a system for integration, management, and coordination of activities of customers accessing an enterprise through a plurality of applications and/or touchpoints.

2. Description of the Background Art

Enterprise applications are tools that are used by companies and organizations to improve their productivity and efficiency, thereby increasing the profitability of the organization. These applications use information that is collected from customers or employees through various sources such as campaigns, web inquiries, leads, delivery, services and support. During the course of normal business, a company, through its systems and employees, interacts regularly with its customers. These interactions can be used to build up relationships with the customers. The information gathered from the employees and customers can be used for acquiring as well as for retaining and growing relationships. This helps in improving customer service while maximizing profits for an organization.

Several enterprise applications that help a company manage customer relationships have been developed in the past. These applications mainly collect information from customers through interactions during a specific function like sales, after-sale service, and surveys. This information is analyzed for specific improvement in the company's processes, applications, products, contacts and the like.

A typical enterprise application maintains a database, which is updated whenever any information is received. Based on the information, the application performs a desired task. Furthermore, the stored data is analyzed to extract vital indicators of customer requirements, product alterations and the like. There are various enterprise applications that exist in the industry. Examples of such applications are Enterprise Resource Planning (ERP), Customer Relationship Management (CRM), Enterprise Application Integration (EAI) and others. Different applications need different kinds of information to achieve the desired results.

In large companies there are many departments, different applications and touch-points, which handle customer and other relationship data in various forms. Customer data can be in the form of emails, telephone calls, faxes and web interfaces. Furthermore, these data can originate from physically different locations. Therefore, a cohesive, intelligent and consistent communication system is advantageous to collect and assimilate data and make it available to all the applications that require customer-related data. This would allow the employees and systems of a company to intelligently and proactively coordinate customer-related activities.

There are several approaches that are being currently used in the industry to achieve coordinated customer activity. One of the traditional approaches is a central database approach. In this approach, a large composite database, or Operational Data Store (ODS), is used. An ODS is an integrated, subject-oriented, detailed store of data used to support operational processing, information gathering and decision-making. Contents of the ODS are updated through the course of business operations.

However, this approach has a number of shortcomings. Firstly, it does not allow bi-directional integration of business processes and rules essential to inform all parts of the enterprise of current events and interactions. Secondly, the scaling of an ODS is limited to the size of the server, thus adding to the complexity of operation in case of increase in the amount of data that needs to be handled. Thirdly, the use of an ODS requires migrating information from other operational systems on a bulk-load basis with an Extraction, Load, and Transform (ETL) process. This increases the process time and also interrupts the operation of the system. Fourthly, an ODS does not provide sub-second query response time for data request from applications that require real-time use. Fifthly, an ODS is inflexible because it provides a set database relational model that cannot easily accommodate new applications, touch-points, or data sources.

Another approach for coordinated customer activity is a central data model approach. This approach involves consolidation of different corporate applications and databases into one vendor's application data model. However, this approach has some limitations. Firstly, since data models are specific to applications, consolidation of different applications and databases is complex. It requires extension of existing data models, which adds complexity to existing applications and makes upgrades and migrations almost impossible. This further requires extensive amounts of data access, batch data movement, and replication, thereby making the approach very expensive. Secondly, since such an approach requires a common data model, it must be put in place and agreed upon by multiple organizations; this can be difficult to accomplish. Therefore, the approach requires a considerably longer time to become operational. Thirdly, the data models used in this approach are very difficult to change once they are locked in place. This approach also lacks the ability to perform data reconciliation, which is the ability to match and correlate unique IDs across source systems for discerning and linking each unique employee, partner, or customer.

Another approach for customer activity coordination is a distributed query approach. Distributed query tools are valuable for defining ad-hoc queries and providing an instance of data across systems. This approach takes into account the data between multiple systems. However, there are many limitations to such an approach. For example, it does not provide a way to update the multi-source view without performing another query. It also fails to support data reconciliation and complex merging of relationship data across overlapping and inconsistent schemas. Additionally, this approach tends to put workloads on various applications that access the customer data that often exceed acceptable service level limits. This approach also fails to apply business rules to provide context on desired user actions.

Yet another approach for customer activity coordination is a distributed publish-and-subscribe event approach. This approach involves usage of Enterprise Application Integration (EAI) vendors and process tools. This approach essentially takes into account the data of a customer, partner, channel, or supplier, between two points of interactions, on a point-by-point basis. Between the two points, EAI may use a common object, which is transient, to map and transform the differences. The EAI approach does not provide a mechanism for data reconciliation. Also, in this approach, the process misses the complete context of a profile as relevant to all the other applications and touch-points that may have data or events significant to that particular transaction. Additionally, this approach is also not very efficient in providing comprehensive and manageable customer data. Further, the EAI approach does not provide a storage location, persistent or virtual, where a query can be run to return data from multiple sources.

A method for customer activity coordination is disclosed in WIPO publication number 02/063491 A2, entitled "Enabling a zero latency enterprise" and assigned to Compaq Information Technologies Group, Inc. (Cupertino, Calif.). This method tries to enable all the communications between various entities of the enterprise in real time. This method integrates enterprise-wide data, applications, business transactions, operations and values. Data related to real-time operations of the enterprise are loaded into persistent storage, known as an Operational Data Store (ODS). The information is synchronized across the enterprise using EAI tools. Rules and synchronization policies are implemented in a hub with the ODS. With these rules and policies, any updates communicated to Zero Latency Enterprise (ZLE) hub from any application across the enterprise can, via the hub, bring about information synchronization in all other applications across the enterprise.

This method lacks the ability to reconcile data on real-time bases hence making any synchronization of data unreliable. Additionally, the ODS, as also described earlier, has limited scalability as data is replicated from the source systems requiring a vertical scaling of the database and the server hosting it. Moreover, since all the information is aggregated in the central repository (ODS), the system is prone to a shutdown on account of failure of the ODS.

There are several tools that utilize one or more of the above approaches for particular applications. CRM tools are the most widely used tools for customer activity coordination. WIPO publication number 01/15030 A1, entitled "Customer relationship management system and method" and assigned to Compudigm International Limited (Wellington, New Zealand), is one such exemplary CRM solution. This system provides a customer relationship management system including a memory in which an interaction database is maintained. The data in the interaction database represents interactions between customers and merchants. The data is retrieved based on a set of criteria. The system uses one central database for all customer data.

However, this approach has certain shortcomings. Firstly, the system uses a single database, limiting the scalability of the system. Secondly, the system does not provide for real-time updating and availability of customer data.

Besides the above-mentioned shortcomings of different approaches used in customer activity coordination, there are several other complexities involved in any attempt to perform customer activity coordination. One is the existence of duplicate data for the same customer. One customer might be represented in the database at multiple locations, creating problems in coordination. This duplication of data can be a direct consequence of the use of multiple systems and communication channels by the customer. Moreover, different organizations, lines of business, applications, and touch-points within the enterprise can add to the fragmentation of the data pertaining to the same customer. Therefore, it becomes difficult to make available a composite view of the customer.

In light of the drawbacks associated with the existing art, there is a need for a system that can provide integration of business processes and rules that are essential to update all parts of the enterprise of current interactions. There is also a need for a system that provides faster and more efficient transfer of information across the enterprise. Further, there is a need for a system that provides real-time updating of information related to a customer. There is also a need for a solution that can deal with duplicate data and has the ability to reconcile and maintain customer data integrity while merging and referencing data for the same customer. There is also a need to capture a customer's activity over multiple channels or applications and leverage the most recent and relevant customer activities at the next interaction point.

SUMMARY OF THE INVENTION

An object of the present invention is to coordinate activities of customers of an enterprise, in real time, across applications, resources and touch-points.

Another object of the present invention is to provide integration of business processes and rules that are essential to inform all parts of the enterprise of current interactions.

Yet another object of the present invention is to provide faster and more efficient transfer of information across the enterprise.

Still another object of the present invention is to provide real time updates of customer information to the applications, resources and touch-points.

Another object of the present invention is to deal with duplicate and inconsistent customer data and maintain customer data integrity and reliability by merging and referencing data for the same customer.

Yet another object of the present invention is to capture customer activities over multiple channels and applications and leverage the most recent customer activities at the next interaction point.

Another object of the present invention is to accumulate data about a customer from all the applications, resources and touch-points of the enterprise and provide a composite view of all the data about a customer to any application, resource or touch-point.

A system, method and a computer program product for integrating, managing and coordinating activities of customers in an enterprise by creating virtual composite objects corresponding to a customer is disclosed. A virtual composite object contains data related to the customer. The customer data is obtained during interactions of the applications, resources or touch-points with the customer. The virtual composite object is created after obtaining customer data relating to previous interactions of the customer with the applications, resources and touch-points. Policies, behaviors and rules of the enterprise are applied to the customer data in the virtual composite object. The virtual composite object of a customer is identified by a unique customer identification index of the customer.

The virtual composite objects are stored in cache memory on a cluster of servers. The servers maintain a list of all customer identification indexes. The servers also store basic customer data on all the customers in a persisted database. This stored data is used to identify a customer's virtual composite object. A server can generate queries for a virtual composite object based on queries received from the applications. On generation of a query, the queried virtual composite object is searched for and delivered, in real time, to the querying server. If the queried virtual composite object is not found in cache, then a new virtual object is created through queries of the source applications and touch-points. The virtual composite objects are updated in real time based upon any event happening at the applications, resources or touch-points.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DETAILED DESCRIPTION OF A PREFERRED EMBODIMENT

A method, system and computer program product for coordinating activities of customers in an enterprise is disclosed. The system serves as an interface between different applications of an enterprise in order to synchronize the exchange of data across the applications. The data is stored as data objects at a central server. Different applications have access to these objects. Each customer has a specific data object corresponding to him/her and has specific attributes, besides the information relating to the customer. The various attributes of these data objects enable a common access point to all applications in the enterprise to the most recent data related to a customer, thereby providing real-time coordination of customer activities in the enterprise. Although the method and system are explained herein in the context of coordinating activities of customers, it must be apparent to one skilled in the art that the invention is not limited to customer activities alone. The method and system can be used to manage any kind of relationship data in an enterprise. For example, relationship data between various employees and partners of an enterprise can be managed using the disclosed method and system.

Figure 1:
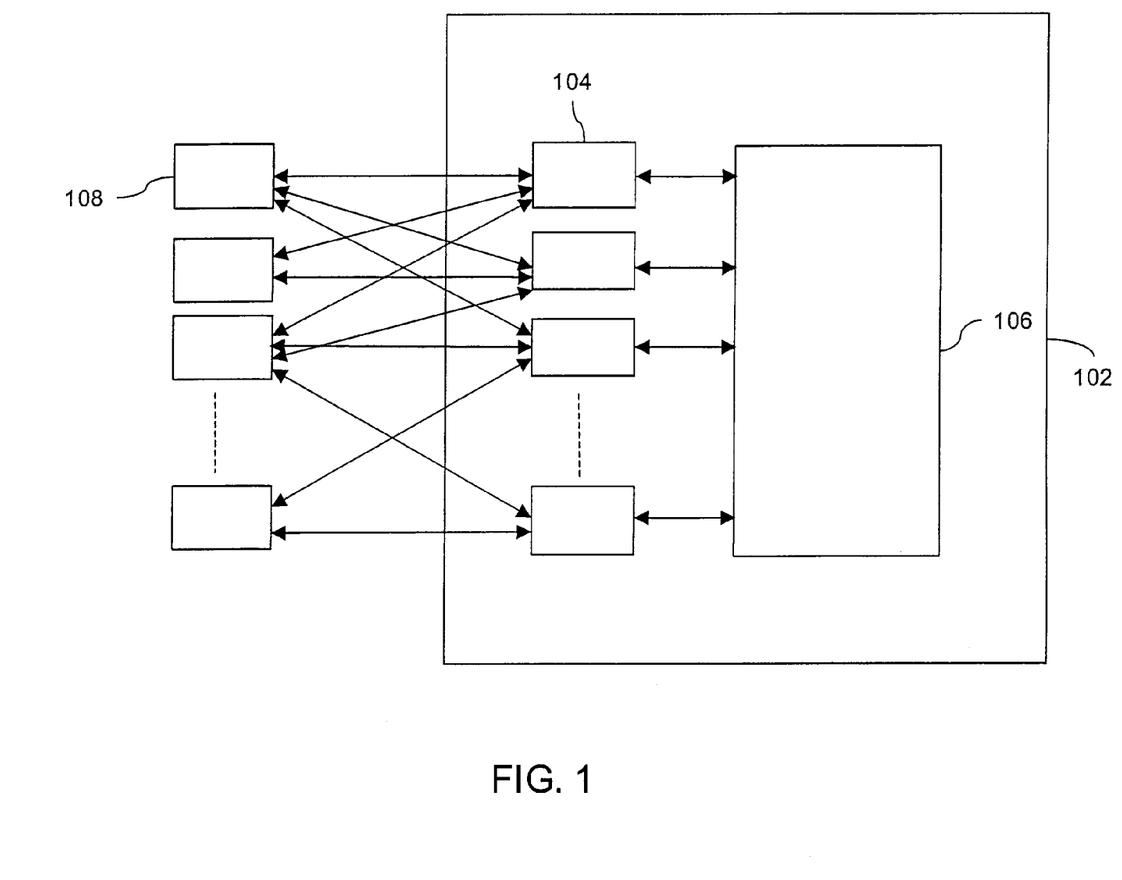
FIG. 1 shows an overall environment of the disclosed system.

FIG. 1 shows an overall environment of a system according to one embodiment. Enterprise 102 comprises a plurality of applications 104 and a server 106. Server 106 may be a single server. Server 106 can also be a cluster of servers connected to each other. A cluster of servers facilitates load balancing in case of large enterprises. Applications 104 can be various enterprise applications such as Customer Relationship Management (CRM) solutions, Enterprise Resource Planning (ERP) solutions, eChannels solutions, and Analysis solutions. It must be apparent to one skilled in the art that the applications mentioned are for illustrative purposes only. The enterprise 102 can consist of various other applications as well without deviating from the scope of the invention. Applications 104 in enterprise 102 interact with customers 108. Applications 104 exchange data about each customer 108, with server 106.

Figure 2:
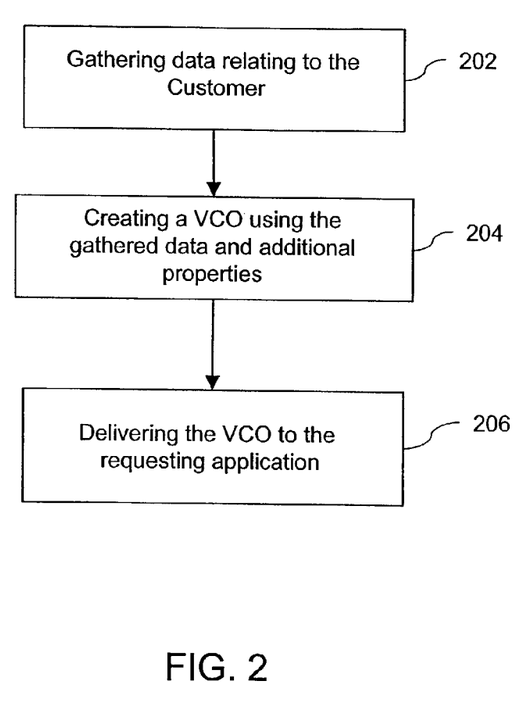
FIG. 2 is a flowchart illustrating an overview of the working of the disclosed system.

FIG. 2 is a flowchart illustrating an overview of the working of the disclosed system. When a customer interacts with the enterprise, the server 106 gathers data relating to the customer at step 202. Customer data is stored in the form of data structures by each application 104. These data structures are referred to as customer objects. A customer object has characteristic properties and information associated with it. For example, in case of a gold customer, the property of the customer is the importance of the customer, which in this case is that he/she is a gold customer. Details of various transactions of this customer form the information associated with the customer object. These properties and information reflect key customer data. This data may relate to previous interactions of customer 108. For example, the data may relate to pre-sales activities of customer 108. This may include information on the different kinds of products looked at before making a decision. Similarly, the data may relate to the behavior of customer 108 during sales or after sales.

The customer object is self-describing. It contains metadata describing the customer object itself. Metadata includes actual object schema. The object schema describes and represents the structure of the customer object. The metadata also includes relationship information on how the customer data in the customer object is associated with other customer objects. It also includes references to customer data in other customer objects. Metadata also identifies which application holds the data for a specific attribute set, and understands what operational methods should be applied to the attribute set. For example, metadata can provide references to the actual data. These references can be used by applications 104 to identify specific attributes that need to be queried.

An object is created using the customer objects from different applications at step 204. This object will hereinafter be referred to as a Virtual Composite Object or a VCO.

The VCO also contains business logic or policies. Based on the state of customer 108, the policies can trigger updates to the object itself as well as trigger events to other objects and their data, policies, applications and processes. For example, the following policy might be defined: "When the object is changed, and the change pertains to a gold customer, notify the head of the marketing division."

The VCO also contains behaviors. Behaviors are specific business logic code. For example, an object can have a behavior that provides business logic that actively polls and monitors the risk of attrition of customer 108. Any application can request that object and hence find out the likelihood of attrition of customer 108.

The VCO can also contain relationship information on how individual data are associated, or how individual data can reference data in other composite objects. For example, a customer object can reference another customer who lives in the same household. Objects encapsulate relationship information through the structure of the logical model of the customer object. Relationship information can express how individual data pieces are associated and can reference attributes in other composite objects. For example, a customer of a business-to-customer (B2C) organization may roll up into a household but customer object corresponding to that customer may also have a relationship from a business-to-business (B2B) organization or account aspect. These relationships can be expressed with meta-models. Meta-models are logical structural models that have links back to source of the physical data. Since the object includes self-describing metadata, the object supports discovery mechanisms through introspection. For example, a requesting application can ask for the metadata and as a result, get the resulting object schema for what can be requested and the hierarchy for navigating the VCO. These behaviors and policies expose their services to external interface as well as trigger events to other policies, applications, processes or interactions with other composite objects. For example, sample business logic could provide the mechanism to "check user mood" or "suggest product recommendation," and then expose that service to any client.

Each customer has a VCO dedicated to its data. The VCO contains all the recent and relevant attributes of that customer. The VCO is stored in cache memory on server 106. Server 106 is connected to all applications 104, resources and touchpoints. Server 106, also referred to as the activity server, will be explained in detail in conjunction with FIG. 3.

The VCO is identified by a customer identification index that is unique to customer 108. The customer identification index is used to search for the VCO during any operation in server 106. The VCO can also be identified by the attributes of customer 108 it represents. These attributes form the basic information that can be used to search the VCO during any operation.

In one embodiment, the VCOs are made operational in-memory and manifest as Enterprise Java Beans (EJB) components. They encapsulate all recent and relevant data about their corresponding customers. Further, they are updated on real-time basis. Updates occur to a VCO when messages are received from applications or source systems that a change to a specific customer record has occurred.

In one embodiment, only the most relevant and active data corresponding to a customer is stored in the server in the form of the customer's VCO. For example, the server utilizes the industry 80/20 rule to cache in memory the most active customers of a company. In case there is a query for any customer who is not in cache, the server can generate a query to the respective application or resource, which has the desired data and dynamically build a VCO for that customer. The exact manner of query will be explained later in conjunction with FIG. 4. The most relevant data may be the contact details and the most recent interactions, and transactions of the customer. The definition of most relevant data may vary from enterprise to enterprise and corresponds to the data that would be most beneficial for serving the customer in the best possible manner. For example, in a certain case only name, address and telephone number of a customer may be stored as relevant data, whereas in another case monthly income, amount transacted along with the name of the customer may be stored as relevant data. Through the use of selectively storing data on a VCO, the need for excess storage space is done away with.

In another embodiment of the disclosed system, only those VCOs corresponding to the most important customers are stored in server 106. Relevant or most important customers are identified and data regarding such customers is kept in the database on server 106 in the form of VCOs. Data about the rest of customers 108 is not stored on server 106. Whenever a query regarding the rest of customers 108 is received, data corresponding to the customer is accumulated from the relevant source systems or applications. Thus the system only maintains referential data, roughly 10% of the data, in the database and leaves the rest of the data in the source system. When an object is required, it first brings in the master referential data from the database and then accumulates the remaining data by querying the source systems.

Figure 3:
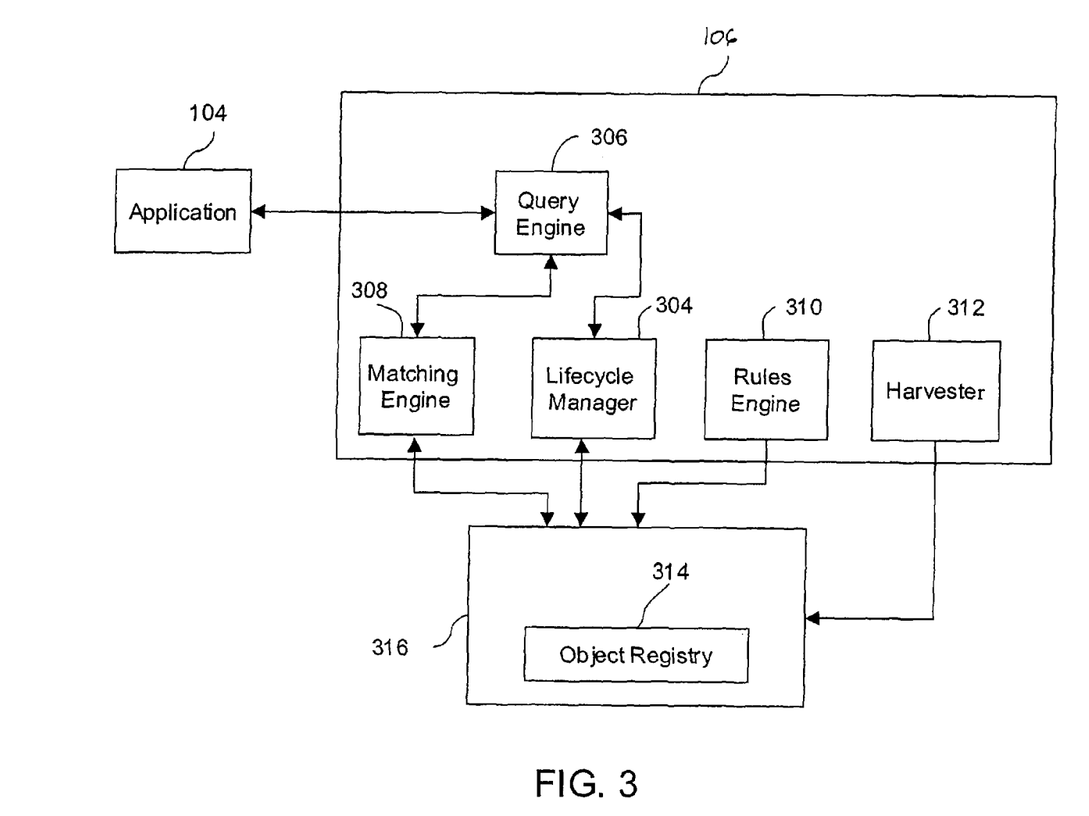
FIG. 3 illustrates the various components of the server in accordance with an embodiment of the present invention.

FIG. 3 shows a block diagram of server 106, also referred to as the activity server. Server 106 has the following main components: lifecycle manager 304, query engine 306, matching engine 308, rules engine 310, harvester 312, object registry 314 and persistent database 316. The functioning of each of these will be explained in detail hereinafter:

Lifecycle Manager

Lifecycle manager 304 manages the lifecycle of the VCOs. It is responsible for creating new VCOs, loading VCOs into the cache and removing VCOs from the cache. VCOs that are cached are ready to respond to requests from applications 104. Lifecycle manager 304 intelligently manages VCO activation and deactivation by utilization of caching retention policies based upon selected customer attributes. Lifecycle manager 304 uses sets of business rules that evaluate for conditions such as: how recently has the customer interacted with the company; how often does the customer interact with the company over a period of time; what is the monetary value of the customer; what is the scenario in which the customer is placed; and the like. These business rules govern the likelihood that data will be needed about that customer. Lifecycle manager 304 also identifies relevant or most important customers and stores the data corresponding to such customers on server 106. One manner in which such segregation of customers is achieved is by utilization of an 80-20 rule. By utilizing the 80-20 rule, lifecycle manager 304 keeps the most relevant 20% of customer in-memory by balancing the likelihood of the data that is requested with the availability of system memory resources.

Query Engine

Query engine 306 is responsible for locating desired VCOs reference data in persistent database 316 of server 106. Queries for a VCO are based on either the customer identification index or through basic information or attributes of a customer. Query engine 306 works with lifecycle manager 304 and persistent database 316 to find or create VCOs in cache and deliver data to applications 104 that requested the data.

Figure 4:
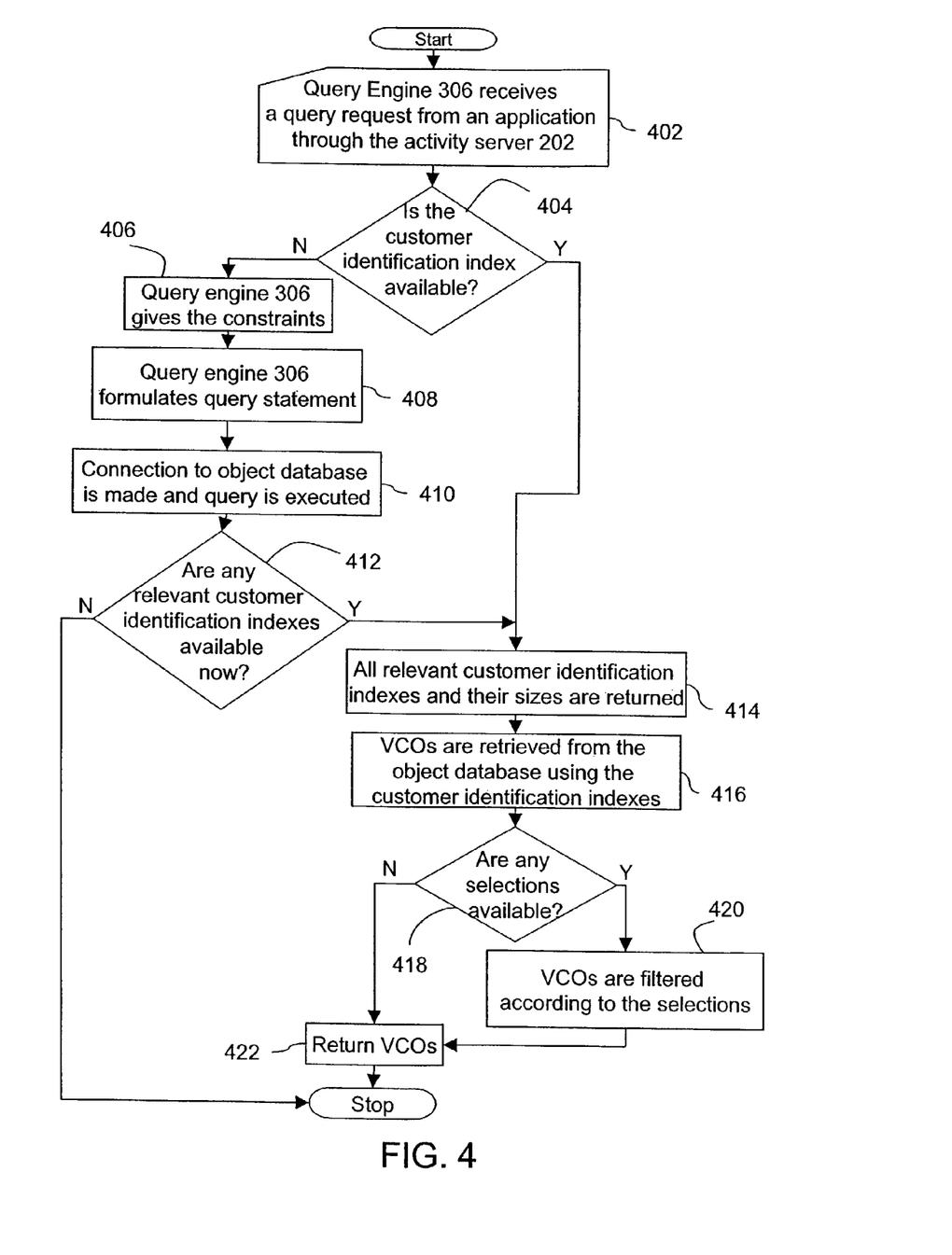
FIG. 4 is a flowchart illustrating the operation of a query engine in accordance with an embodiment of the present invention.

Referring now to FIG. 4, there is shown a flowchart illustrating the operation of query engine 306. At step 402, query engine 306 receives a query request from an application 104 through server 106. At step 404, query engine 306 checks if a customer identification index is available with the query. If the customer identification index is not available then query engine 306 gives constraints for the query. Constraints are given in order to refine the query and obtain specific results. For example, the constraint can be to search for all customers who have purchased a specific item. Data relating to only those customers that satisfy such constraints is searched for. At step 408, query engine 306 formulates a query statement. A query statement includes the exact description of the data requested and has a format best suited for server 106 to carry out the request. At step 410, a connection is established with the database in server 106 and the query is executed. By executing the query relevant customers are searched for in the database according to their customer identification indexes. In one embodiment, the queries are generated using the Sequential Query Language (SQL). At step 412, query engine 306 verifies whether customer identification index of any relevant customer's VCO is available or not. Relevant customer identification indexes are thus mined for, if they are not directly available with the query request. Once the customer identification indexes are available, at step 414 all relevant customer identification indexes are returned with their sizes. At step 416, VCOs corresponding to the relevant customer identification indexes are retrieved from object registry 314. At step 418, the query request is checked for any selections. Selections can be a specific attribute or attribute sets that are selected for a query, such as customer name, customer address and the like. If there are any selections, then at step 420, the VCOs are filtered according to the selections. At step 422 the relevant VCOs are returned to application 104 that had initially sent the query request. Thus, query engine 306 executes the query requests of applications 104 or source systems.

Matching Engine

Matching engine 308 performs customer matching in real-time by matching certain attributes. Name, address, email, and social security number are examples of customer attributes received from application 104 which can be used for customer matching. These attributes are matched against the existing customer information in persistent database 316.

Figure 5:
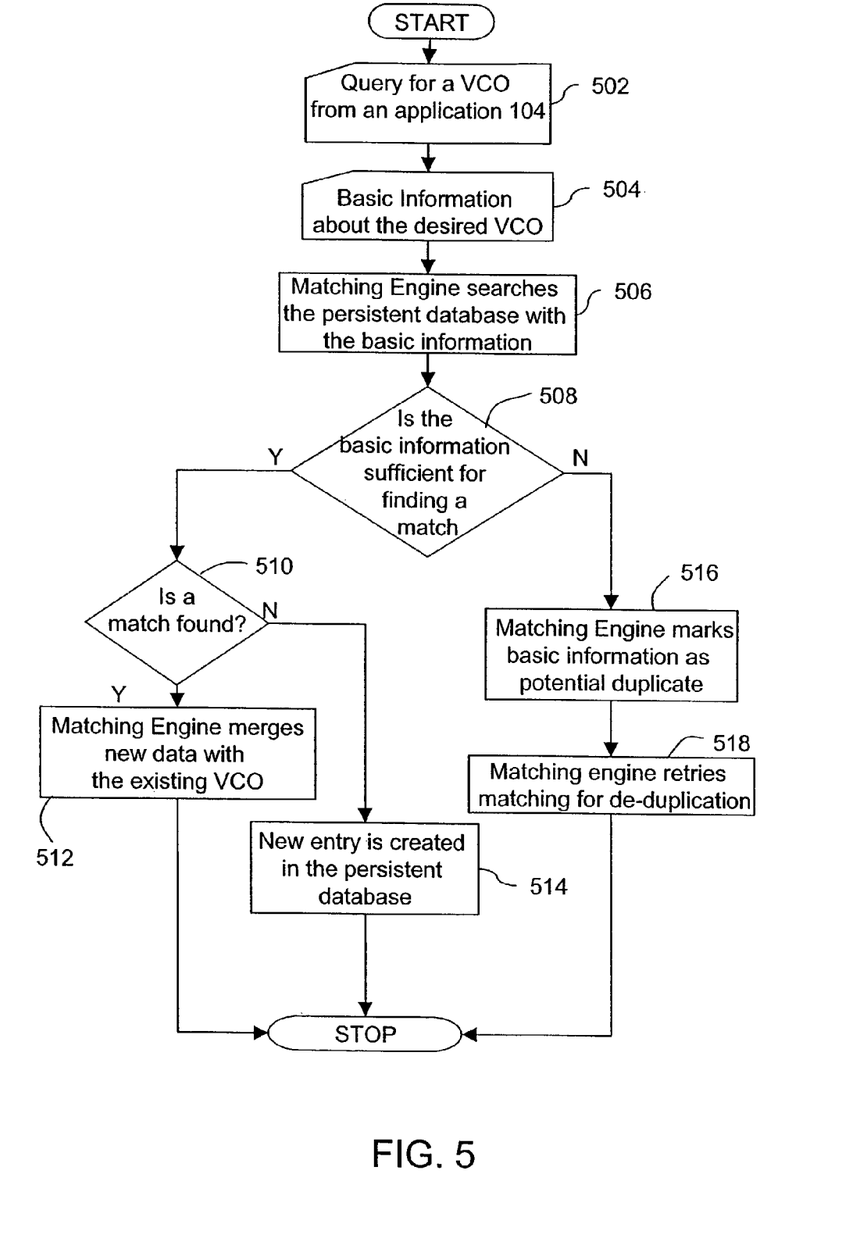
FIG. 5 is a flowchart illustrating the operation of the matching engine in accordance with an embodiment of the present invention.

Referring now to FIG. 5, there is shown a flowchart illustrating the operation of matching engine 308. Application 104 or server 106 generates a query for a VCO. At step 502, matching engine 308 receives the query from query engine 306. At step 504, matching engine 308 receives basic information about the desired VCO. For example, the basic information about the VCO can include a source system identification number of the VCO or a customer identification index. Matching engine 308 receives this basic information from object registry 314. At step 506, matching engine 308 uses the basic information to search persistent database 316. Matching engine 308 utilizes object registry 314 that maintains a cross-index of all the local customer identification indexes used to represent the same customer. The cross-index correlates all of the customer identification indexes against primary attributes, like names, of customers. At step 508, matching engine 308 determines if the available basic information is sufficient for finding a match. If it finds a match with an existing customer, then at step 512, any new data from application 104 is merged and linked with the existing customer identifier in place. If matching engine 308 does not find a match, then at step 514, a new entry is created in persistent database 316 and a new VCO is formed. If matching engine 308 determines that matching is partial, but there is potential for a match from application 104, then at step 516, matching engine 308 marks the basic information as a potential duplicate and it is dealt with as an exception. At step 518, matching engine 308 retries the matching as part of de-duplication. In de-duplication, possible matches are verified by utilizing an exception process. In the exception process, identical records are identified. A decision as to whether to merge the identical records or specify them as different and remove them from matching engine 308 is left for a user. Matching engine 308 also performs standardization of data and verification with external data sources utilizing heuristic algorithms. Matching engine 308 looks at attributes such as name, address, email, social security, and the like, from each source system and makes an evaluation to see if there is a likely match with another source system. It does this by assigning match IDs and comparing the likelihood of a match by looking at how closely the match identification numbers resemble one another. It facilitates easy maintenance and flexibility in managing customer associations across different applications 104 and continuously finds and corrects data inconsistencies. In practice, it has been found that although an enterprise having 20 million customer entries in its database, may have only 14 million customers, with the remaining 6 million being duplicate entries in its database.

Rules Engine

Figure 6:
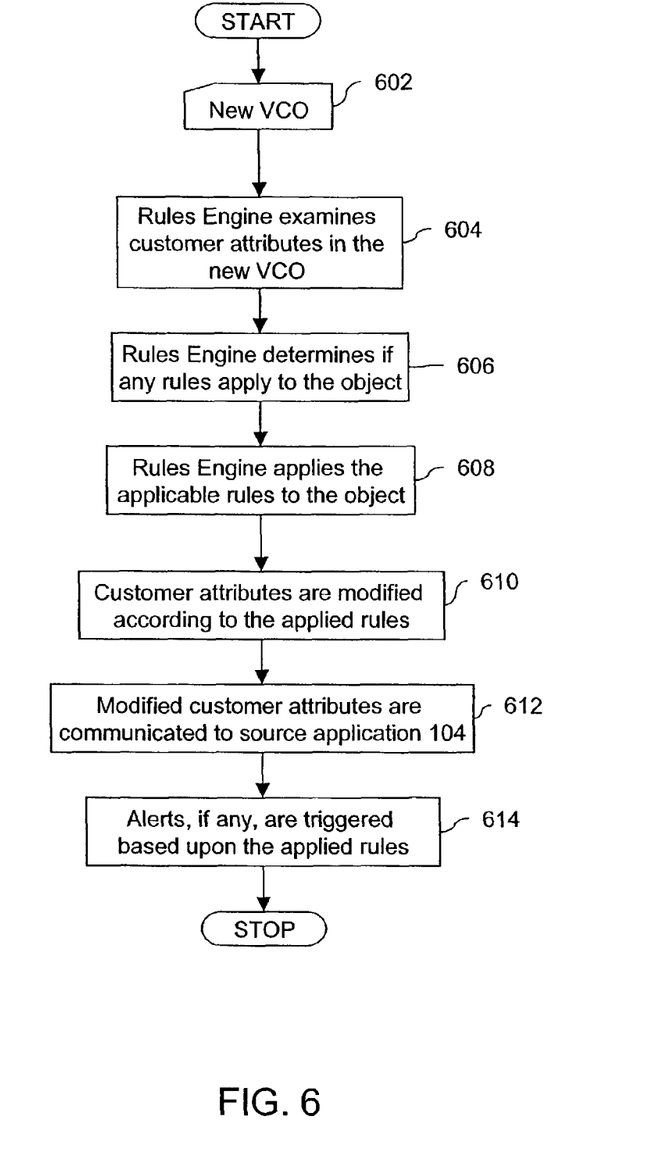
FIG. 6 is a flowchart illustrating the operation of a rules engine in accordance with an embodiment of the present invention.

Rules engine 310 is a multi-threaded engine; it is a resource used by other components of server 106 to trigger actions based on certain configured rules. Referring now to FIG. 5, there is shown a flowchart illustrating the operation of rules engine 310. Rules engine 310 applies rules logic to VCOs when they are initiated. For example, a policy through the rules can be applied to an object to notify an individual if a customer satisfies a certain condition. At step 504, rules engine 310 examines customer attributes contained in the VCO. At step 506, rules engine 310 determines if any rules apply to the VCO. At step 508, applicable rules are applied to the VCO. A list of actions follows the application of rules. At step 510, customer attributes are modified according to the applied rules. At step 512, the modified customer attributes are communicated to source application 104, which is the source for the information on the customer. At step 514, alerts, if any, are triggered based upon the applied rules. In an embodiment of the invention, a "JESS" rules engine available from Sandia National Laboratories is employed. Rules engine 310 works by evaluating if—then logic. For example, a rule can state, "if customer is high value customer, then offer cross sell promotion."

Harvester

Harvester 312 assembles customer data from applications 104. Harvester 312 distributes and manages the data gathering process through asynchronous and synchronous messaging using harvest agents. Harvest agents are implemented by specifying connectivity to source system or application 104 connectors. Harvest agents issue queries and commands to applications 104 and wait for their responses. Once responses to harvesting requests have been received, harvester 312 assembles the VCO and makes it available in the cache. The harvesting process will be explained later in conjunction with FIG. 7.

Object Registry

Object registry 314 maintains a list of what VCOs have been initiated on which server 106. By using this registry, the system ensures that only one instance of the VCO is always used throughout enterprise 102. Concurrent access to object registry 314 is supported. Replication of object registry 314 avoids overloading and in turn prevents system failures. In one embodiment, object registry 314 is created when server 106 is started. Only designated primary and secondary servers contain the registry, which maintains synchronization via in-memory replication.

Persistent Database

Persistent database 316 stores basic information about a customer used to match an unknown customer. It can also store derived information not found in applications 104. For example, persistent database 316 can store totals of different values provided by applications 104. Persistent database 316 also stores object registry 314 used for matching customers in persistent database 316 with customers in other applications 104.

Server 106 described above performs four processes to exchange data with the VCOs and for managing the VCOs. These processes are harvesting, event listening, writing back and lifecycle caching. These processes will be explained in detail hereinafter.

Harvesting

Figure 7:
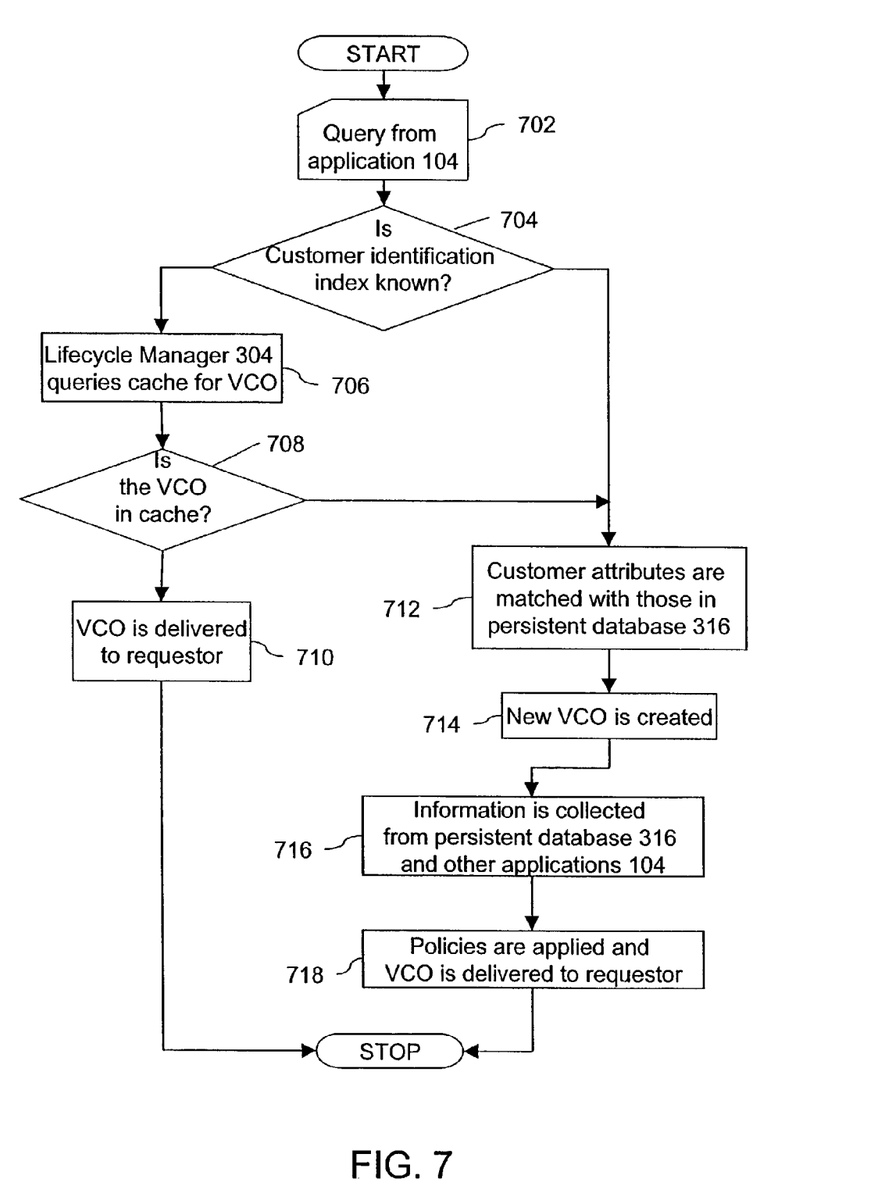
FIG. 7 is a flowchart illustrating the harvesting process in accordance with an embodiment of the present invention.

FIG. 7 shows a flowchart illustrating the harvesting process. Application 104 makes a query to a particular VCO as shown in step 702. At step 704, it is identified whether the customer identification index of the requested VCO is known or not. If the customer identification index is known, then at step 706 lifecycle manager 304 queries the cache for the corresponding VCO. The query can be formulated, for example, using XML Path Language (XPath) or Structured Query Language (SQL). At step 708, the VCO is checked for in the cache. If the VCO is found in the cache, then at step 710 it is delivered to application 104 that requested for the VCO.

If the VCO is not found in the cache or if the customer identification index is not known, then at step 712 the attributes of the queried customer are matched against those stored in persistent database 316. At step 714, a new VCO is created. At step 716, Harvester 312 obtains basic information about the customer from persistent database 316. Harvester 312 also gathers information about the customer from other applications 104. At step 718, policies and rules of enterprise 102 are applied to the new VCO and it is delivered to application 104 that sent the initial query. The queries of application 104 or any source system can be directly sent to persistent database 316, if it is connected at the database level, but most often are accessed through Application Programming Interface of the source application.

Event Listening

Server 106 listens for events that are published via Extensible Mark-up Language (XML) messages. These events are any operations occurring in applications 104 that affect any of the VCOs. The server correlates these events by listening on a message bus for particular topics. The events then get routed to the appropriate objects if a change occurs that needs to be processed. For example, server 106 listens to events such as deleting of an existing customer object, creation of new customer object or any change in the attributes of a customer. Based on these events, server 106 updates existing VCOs. If a new customer is created in any application 104, lifecycle manager 304 first attempts to match the new customer against object registry 314. If there is insufficient information that has been passed on to lifecycle manager 304, then lifecycle manager 304 begins the harvesting process to collect the remaining information and then attempts to match it again. If no match is found, the new customer is added to persistent database 316 and the newly created composite object is loaded onto the cache. If the customer already exists in persistent database 316, lifecycle manager 304 loads that VCO onto the cache. If attributes of any customer object changes in any application or touch-point, server 106 captures this event and applies the content values from the event and any policies to the corresponding VCO. In this manner, the VCO is kept constantly updated.

Writing Back

Data about a customer can reside in a plurality of applications 104. Depending on operational processes of enterprise 102, it may take time for changes in one application 104 to be populated in another application 104. Server 106 helps manage multi-source application synchronization. Through server 106; any updates to a VCO from one application 104 can have policies applied, in order to update the same information in another application 104. Any changes in customer attributes at any of applications 104 are updated in real time in the VCO allocated to that customer. Since, it is ensured that only one instance of VCO is utilized throughout enterprise 102, the information updated is immediately available for other applications 104.

Lifecycle Caching

The lifecycle of VCOs in cache is managed intelligently in order to optimize customer lookup. This pertains to the lifecycle rules and policies that manage and govern the VCOs to be kept in memory or to be deleted. Through lifecycle manager 304, objects are removed, created or loaded into cache and are then managed through cache retention policies. A VCO that has not been in use for a long time is deleted and the information contained in it is sent back to application 104 that was the source of this information. The time duration for which the VCO can remain unused is user-defined and can be changed as needed. In an embodiment of the disclosed system, a VCO can "expire" based upon the lifecycle rules in place and the memory resources available in the system. Lifecycle manager 304 uses a value system; the objects that are the lowest value get purged first. Lifecycle manager 304 balances memory and resource availability of server 106 with number of objects that are maintained in the memory.

Having explained the concept of a VCO and its implementation on the activity server, the invention will hereinafter be described with an exemplary implementation technique of the VCO and the activity server. A model-driven approach can be used to implement the VCOs and design each component of server 106.

The model-driven approach utilizes a framework that aids in creating, loading and testing all necessary models and files to run server 106. The framework synchronizes functionalities of various applications in an enterprise 102 in order to create a complete VCO specific to a customer. The framework has a graphical user interface. An employee of enterprise 102 can handle the framework through a graphical user interface. Any changes in the enterprise are conveyed to the employee through this interface. The employee is kept informed about the changes in the states of VCOs through graphical symbols or through messages and reports about the VCOs.

The framework has five components to create and manage a VCO: Model, Match, Map, Load and View. Each of these is explained below in detail.

Model

The Model supplies all necessary tools for creating the VCO model. The approach to modeling leverages traditional object modeling and data modeling. The VCO model is a real-time model for profiling information that relates to a customer or other resources of enterprise 102. Object models are utilized to organize, visualize and construct a VCO application that is most favorable for real-time decisions. The object models model real-world entities and encapsulate key data and behaviors based on enterprise business requirements. In the preferred embodiment, VCOs are Extensible Markup Language (XML)-based and are designed to allow extensibility while providing consistency.

The Model uses two types of data definitions to create an object model: Simple and complex. Simple types represent system and user-defined definitions for data types like Boolean, string, date, etc. In addition, other simple types such as: enumeration, patterned string, and ranged value can be created. Complex types give base definition for the object model and represent a single or group of attributes. Once the base definition is created, it can be used and re-used in the operational definition of the object model called an attribute set. An attribute set uses the complex type instance and contains additional operational values that are used by server 106 at runtime. Match, Persist, Harvest, Occurrence, Source, Priority and Required Attribute are the different types of operational values attached to the attributes. Operational value Match relates to the attributes that are used for matching. Operational value Persist relates to the storage of attributes in persistent database 316 for either matching purposes or because the resultant data does not exist in any other application. Operational value Harvest relates to the attributes that are gathered from source applications when the VCO is created. Operational value Occurrence specifies the cardinality of the attributes such as one-to-one, one-to-many, many-to-many etc. Operational value Source specifies source application 104 that contains the contents of the attributes. Operational value Priority specifies the order of the multi-source applications 104 where these attributes could reside. Operational value Required Attribute specifies the required attributes that are needed to complete a data merge function in a multi-source reconciliation process. Once attribute sets are created, they can be updated by using the same instances of Complex types. Once the Complex Type is updated, every attribute set using that instance will automatically be updated. This makes it much easier to change and manage large object models.

The Model facilitates creation of categories that help group definitions into logical categories. This makes it simple to navigate, manage changes, collaborate, and generally manage large object models. The Model has four types of relationships that can be used in creating the VCO model: inheritance, Primary Key (PK), Foreign Key (FK) and remote references. With inheritance, multiple complex types are created; child complex types inherit the attributes of the parent complex types. This functionality facilitates the creation of sub-type definitions where several definitions may share common attributes. PK and FK relationships facilitate the setting up of traditional relationships between definitions of attribute set. Remote references relate an attribute set definition from one VCO model to another VCO model. All these relationships make it easier to deliver complete information to a graphical user interface of the framework.

The Model has two views of the composite object model. A "tree view" displays the "ordered" contents of the in-progress model being developed, while the "diagram worksheet view" presents a graphical view of the composite object model that can be used as a presentation medium for discussion of the attribute sets, their data structures and relationships needed for project and business planning. Updates to either the tree view or the default hierarchical diagram are automatically reflected in another pane of the graphical user interface.

Match

In the Match component of the framework, the process of matching is carried out. This process is carried out in four steps. Firstly, the source records are standardized, matched and indexed. Secondly, a reference table of indexes and reference data is built and loaded. Thirdly, run-time matching rules for recognizing existing and new users are validated and tested. Fourthly, matching exception process is examined and set up to automatically revalidate all changed records.

A set of attributes from the VCO model that will be used to match an unknown customer object from application 104 with a VCO is designated as a match-set. The component Match supplies a simple user interface to set up criteria for matching common customers across multiple applications 104. Using the Match component, basic attributes are selected from the VCO model, pre-process steps are applied and sensitivity of the match set is chosen. Appropriate match sets are then selected and match criteria or rules are created. Matching engine 308 uses thee criteria or rules to assess the match. Sensitivity of a match set indicates how accurate each customer object should be to determine if it is a match. For example, social security number may be an exact match but customer name may be a less exact match. Match criteria are ordered rules that define the sequence of using match sets to determine a match on an object. Matching engine 308 uses each rule in sequence to determine a match. An embodiment of the disclosed system utilizes Match types during the matching process. Match types provide additional processing power where specifying the type helps matching engine 308 recognize derivatives and abbreviations.

Different pre-process functions may be applied to an attribute to generate different attribute results used during the matching process. Concatenate pre-process function combines attributes together to be used as a match set. For example, for a customer object having attributes as first name=John, middle name=Harry, middle name=Oliver, and last name=Smith, the concatenate process combines these into a single name, John Harry Oliver Smith, and uses this for matching. Permutate pre-process function varies combinations of attributes to be used as a match set. For example, for a customer object having attributes as first name=John, first middle name=Harry, second middle name=Oliver, last name=Smith, the permutate pre-process results in two items: John Harry Smith and John Oliver Smith.

Map

In the Map component of the framework, application 104 is mapped to a VCO model. In a preferred embodiment, eXcelon Corporation's Stylus Studio™, a graphical Extensible Stylesheet Language Transformation (XSLT) tool, is used for mapping applications 104 to the VCO model. All project files are managed through the framework. This makes it quick and easy to generate all the files for mapping harvesting requests, events, write backs and views. Using sample XML from the framework and the external application source, a preview can be seen of the XML output. Once the entire mapping is complete, the project can be saved and submitted to server 106.

Load and View

The Load component of the framework helps in loading of the basic data of a customer that is used for matching, into persistent database 316. Once the data has been submitted to server 106, the View component of the framework is used to search for VCOs by either customer identification index or entering search parameters such as object, attribute sets, attributes, and the like. Search results present the entire VCO contents.

Applying and Managing Context

Alerts, scenarios and policies are applied to a VCO in order to truly understand what is occurring with the VCO. Alerts, rules and conditions can be set up and customized for a particular enterprise. For example, an alert is sent to a sales representative in enterprise 102 indicating that a customer's product shipment has just been delayed. This alert is not valid forever, so the alert can be deactivated after a certain amount of time has elapsed. The alerts, rules, and conditions can be customized to fit a particular organization.

To handle various business scenarios, a scenario rule can be set up whereby an attribute or a set of attributes in the VCO can be updated or have a value set for it. The framework supplies two types of intelligent values: explicit data values and derived data values. An example of explicit data value is to keep a running total of a customer's total purchases across enterprise 102 over a period of time. Each time a customer makes a product purchase, the scenario rule updates the VCO with the new total for that period. Customer mood is an example of a derived data value based on a customer's frequency and recency of interactions with the company and status of product delivery and problem reports. If the frequency is sufficient and is over a short period of time and product delivery status is delayed and problem reports are still pending, then a scenario rule can be set to indicate that the customer's mood may be unhappy.

Enterprise 102 has customer data that resides in applications 104 within enterprise 102. The way data is entered into each application 104 depends on who is entering that data. While the finance or operations organization will be concerned with the complete record, a sales team may typically enter only a phone number, email address and name. The processing time taken to populate different applications 104 with updated data can create delays in the system. It is a process that can be done manually or via email in certain cases. Source systems are prioritized in order to deal with specific customer information.

The present invention ensures that applications 104 that need to be searched are available before redundant data is looked for. But, as with any enterprise, sometimes those systems are not available; they may have long lag times in querying information or they may be down for maintenance. Hence, certain timeouts are set for the identified source applications. The timeout period is configurable and may vary depending on type of source system.

Two methods can be used to manage, merge, and update data from multi-source applications 104. These methods are Priority and Time Stamp. Priority is based on the way the source systems are prioritized. This is generally used when it is certain that the first priority application 104 always has the most accurate information. If a Priority application 104 does not respond or is not available, then it defers to the next Priority application 104. Time Stamp is based on the comparison of aggregated data to determine which application 104 was updated most recently; or the latest time stamp. With each of these methods, a "Wait" or "non-Wait" state can be placed on the harvesting process. A Wait state option will wait until all responses are returned from the harvesting request before proceeding with the appropriate update. In this way, the most accurate data based on the policy is supplied, but this may impact the delivery of the VCO to a requestor. A non-Wait state is used for performance optimization. It will take the first application 104 that responds and updates the composite object until such time that the appropriate application 104 data is collected and populated into the VCO.

Advantages

The present invention helps companies to enhance enterprise view of a customer with actionable, real-time VCOs. A VCO is a flexible, object-oriented model that encapsulates key data and behaviors from ERP, CRM, eCommerce and Analysis applications. With access to critical information from all applications 104 and touch-points, the user has the power to provide relevant offers, answer questions knowledgeably, and resolve problems quickly. The present invention aids quick build-up and deployment of real-time contextual customer view. Server 106 as proposed in the invention is a clustered, multithreaded engine that captures customer sessions in real time. The real-time solutions enable companies to satisfy, retain and grow customer relationships. The present invention provides bi-directional communication in both synchronous and asynchronous fashion. The present invention integrates the data obtained from customers 108 by offloading the queries, thus avoiding over-burdening of applications 104. The invention is a lighter weight, yet more robust, mechanism for aggregating data than replicating data into another data store. Through a model-driven approach, the logical model provides a way to easily and flexibly change business logic for the bi-directional synchronization and propagation of clean accurate data to the source systems. The logical model approach also allows multiple models to be created within the same server for multiple purposes as opposed to a hard-set relational model. Furthermore, this approach is the only approach that truly looks at composite data to evaluate information reliability. With all these advantages, the present invention facilitates customer processes by coordinating the customer activities in enterprise 102.

Hardware and Software Implementation

The system of the present invention, for example, can be implemented on a dual CPU with 800 MHz or higher processor. The preferred embodiment of the current invention can be implemented on a clustered server environment with two clustered servers. These servers can be, for example, four-way Sun E450 servers running at 400 MHz. They can be run against a separate server with an Oracle 8i database. All the functions of server 106 can be implemented with desired results on such an environment. Various software that can be used for the implementation of the disclosed system are: Windows 2000 server SP2 or Solaris 8.0 as Operating system, MS-SQL 2000 or Oracle 8i for persistent database 316.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computerized system for managing activities of customers in an enterprise comprising a plurality of distributed data storages, the system comprising:
   a query engine for receiving from an application a request for data relating to a customer;
   a matching engine for identifying the customer from referential data stored in a first data storage;
   a harvester for gathering interaction data relating to interactions of the customer with the enterprise from a second data storage based on the identification of the customer by the matching engine;
   a lifecycle manager for creating a composite object for the customer using the gathered data and providing the composite object to the query engine for the query engine to deliver the composite object in real time to the application, wherein the composite object encapsulates a set of update rules; and
   a rules engine for updating the composite object stored in a cache memory according to the set of update rules and communicating changes to the composite object to the second data storage in response to the customer's interaction with the application.

2. The computerized system as recited in claim 1, wherein the matching engine is further for reconciling the gathered data to remove duplicate entries.

3. A computerized system for managing activities of customers in an enterprise comprising a plurality of distributed data storages, the system comprising:
   a query engine for receiving from an application a request for data relating to a customer;
   a matching engine for identifying the customer from referential data stored in a first data storage;
   a harvester for gathering interaction data relating to interactions of the customer with the enterprise from a second data storage based on the identification of the customer by the matching engine;
   a lifecycle manager for creating a composite object for the customer using the gathered data and providing the composite object to the query engine for the query engine to deliver the composite object in real time to the application; and
   an object registry that associates a customer identification index with a cross-reference that is used to represent the same customer in the second data storage, wherein the matching engine identifies the customer by identifying the customer identification index, wherein the harvester gathers the interaction data relating to the customer from the second data storage based on the cross-reference associated with the customer identification index identified by the matching engine.

4. The computerized system as recited in claim 3, wherein the lifecycle manager is further for selecting the most relevant data relating to the customer to create the composite object.

5. A computer implemented method for centrally managing data that relates to interactions of customers with an enterprise and that is stored in a plurality of distributed data storages, the method comprising:

receiving from an application a request for data relating to a customer;

gathering data relating to the customer from at least first and second data storages;

for the customer, creating a composite object that encapsulates the gathered data and a set of policies for updating data relating to the customer stored in the first and second data storages, wherein creating the composite object comprises applying a set of lifecycle rules to the composite object to manage a lifecycle of the composite object in a cache memory;

maintaining the composite object in the cache memory based on the set of lifecycle rules in order to optimize customer look up;

delivering the composite object in real time to the application;

from the application, receiving changes to at least a portion of the gathered data for the customer; and using the received changes to update the data stored in said first and second data storages based on the set of update policies.

6. The method as recited in claim 5, wherein the first data storage stores referential data to identity the customer and the second data storage stores interaction data relating to interactions between the customer and the enterprise, wherein gathering data relating to the customer comprises:

formulating a query based on the request, querying the first data storage to identify the customer, obtaining referential data specific to the customer from the first data storage, and based on the identification, obtaining interaction data relating to the customer from the second data storage.

7. The method as recited in claim 5, wherein using the received changes to update the data comprises:

capturing a customer interaction that changes the composite object delivered to the application, and updating in real time the data stored in said second data storage based on the captured customer interaction.

8. A computer implemented method for centrally managing data that relates to interactions of customers with an enterprise and that is stored in a plurality of distributed data storages, the method comprising:

receiving from an application a request for data relating to a customer;

gathering data relating to the customer from at least first and second data storages, wherein gathering data relating to the customer comprises identifying a unique customer identification index associated with the customer, accessing an object registry that maintains a set of cross-references to the customer identification index used to represent the same customer in the plurality of distributed data storages, and using a cross-reference in the set of cross-references to obtain the interaction data relating to the customer from the second data storage;

for the customer, creating a composite object that encapsulates the gathered data and a set of policies for updating data relating to the customer stored in the first and second data storages;

delivering the composite object in real time to the application;

from the application, receiving changes to at least a portion of the gathered data for the customer; and using the received changes to update the data stored in said first and second data storages based on the set of update policies.

9. The method as recited in claim 8, wherein the request comprises referential data related to the customer, wherein identifying the unique customer identification index comprises querying the first data storage to match the referential data in the request against the referential data stored in the first data storage.

10. A computerized system for managing activities in an enterprise, the enterprise comprising a plurality of data sources, the system comprising:

a query engine for receiving a request from an application for data relating to a customer associated with the enterprise;

an object registry that associates a customer identification index with a plurality of different cross-references that is used to represent the same customer in the plurality of data sources;

a matching engine for receiving the request from the query engine for a composite object relating to the customer and accessing the object registry to obtain a set of cross-references;

a harvester for gathering data relating to the customer from at least two data sources in the plurality of data sources based on the set of cross-references obtained from the object registry;

a lifecycle manager for creating a composite object for the customer using the data gathered by the harvester and providing the composite object to the query engine for the query engine to deliver the composite object in real time to the requesting application, wherein the composite object encapsulates a set of synchronization rules; and a rules engine for synchronizing changes to the gathered data of the composite object to at least the first and second data sources in real time based on the set of synchronization rules.

11. The computerized system as recited in claim 10 further comprising a cache memory for storing the composite object.

12. The computerized system as recited in claim 10, wherein the matching engine is further for reconciling the gathered customer data to remove duplicate entries.

13. The computerized system as recited in claim 10, wherein the lifecycle manager is further for selecting the most relevant data relating to the customer to create the composite object.

* * * * *